Feb. 24, 1925.
B. WOODS
FISHING TOOL
Filed Oct. 11, 1923
1,527,499
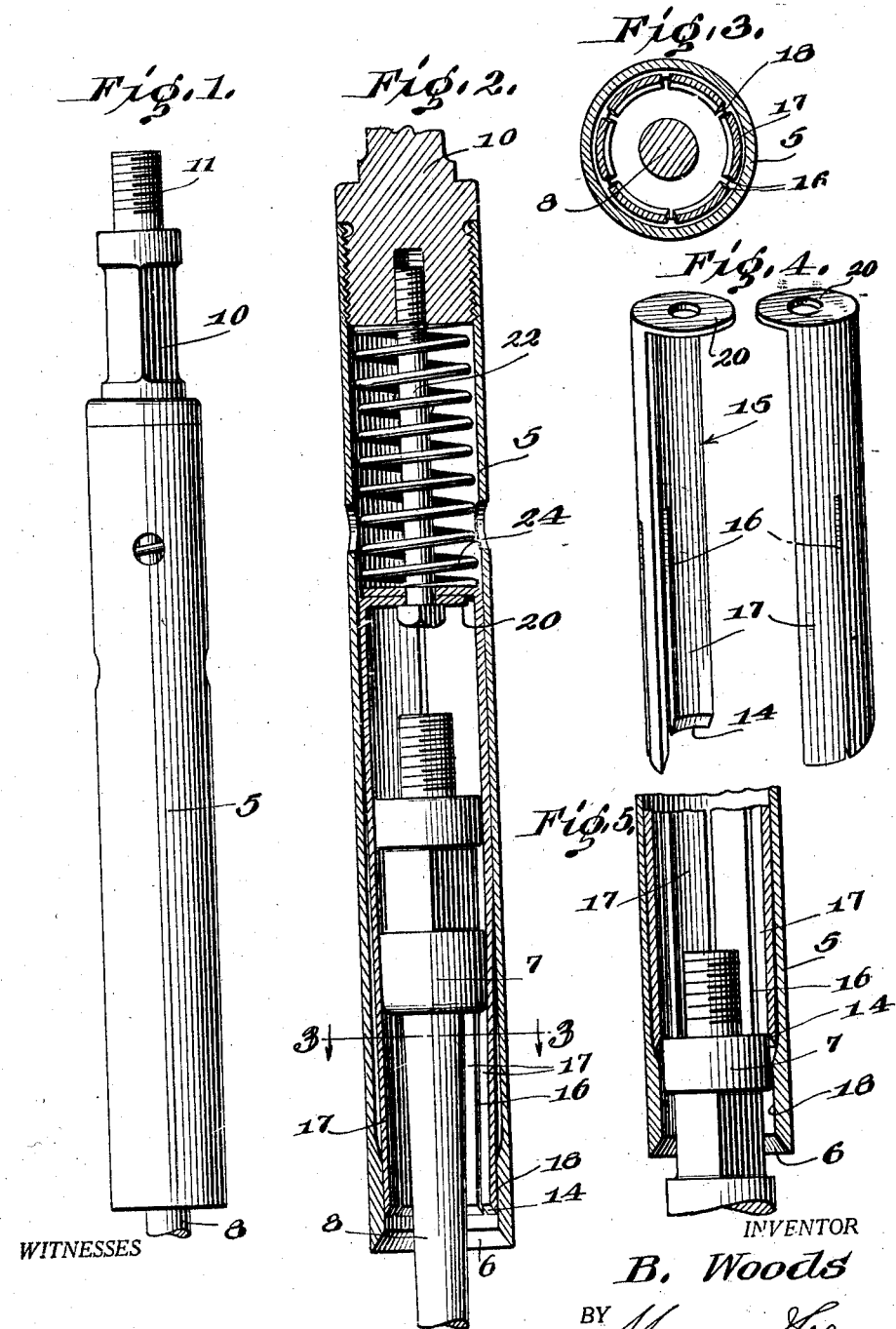
WITNESSES
INVENTOR
B. Woods
BY
ATTORNEYS Patented Feb. 24, 1925.

1,527,499

UNITED STATES PATENT OFFICE.

BERT WOODS, OF TULSA, OKLAHOMA.

FISHING TOOL.

Application filed October 11, 1923. Serial No. 667,956.

*To all whom it may concern:*

Be it known that I, BERT WOODS, a citizen of the United States, and a resident of Tulsa, in the county of Tulsa and State of Oklahoma, have invented certain new and useful Improvements in Fishing Tools, of which the following is a specification.

This invention relates to fishing tools, and especially adapted for use in oil and gas wells.

Briefly stated, an important object is to provide a fishing tool especially adapted for use in recovering broken sucker rods and the like, and which is characterized by the absence of toothed slips, and which is provided with simple means whereby the inside diameter at the mouth of the tool may be enlarged for the entrance of a box of a sucker rod and subsequently decreased so that the box of the sucker rod will be effectively trapped.

A further object of the invention is to provide a fishing tool which is of highly simplified construction, durable in use and cheap to manufacture.

Other objects and advantages will be apparent during the course of the following description.

In the accompanying drawing forming a part of this application, and in which like numerals are employed to designate like parts throughout the same, Figure 1 is a side elevation of the improved tool in use, Figure 2 is a vertical sectional view through the tool in use, Figure 3 is a horizontal sectional view taken on the line 3—3 of Figure 2, Figure 4 is a group perspective illustrating a pair of liners embodied in the invention, Figure 5 is a detail sectional view illustrating the manner in which the box of a sucker rod is introduced into the socket of the tool.

In the drawing wherein for the purpose of illustration is shown a preferred embodiment of the invention, the numeral 5 designates a body having a socket extending through the major portion thereof and having its forward end beveled inwardly as indicated at 6 so as to guide the box 7 of a sucker rod 8 into the socket.

The tool is provided with a head 10 having an attaching portion 11 to which the lowering means is connected.

When the tool is lowered into the well, the inwardly beveled forward end 6 of the body 5 guides the box 7 into the socket and into engagement with the inwardly beveled forward ends 14 of a pair of liners 15. The liners 15 are semi-circular in cross section, and are formed with longitudinal incisions 16 which define a plurality of spring arms 17. The spring arms 17 normally overlie an internal shoulder 18 in the forward portion of the body 5 and when the forward ends of the slips are engaged they are moved rearwardly to the position illustrated in Figure 5, so that the box 7 can enter the portion of the socket rearwardly of the shoulder 18. It might be said that the forward portion of the socket in the body is of a reduced diameter and is only large enough to permit of the snug passage of the box 7, and when the box 7 has entered the socket, as shown in Figure 2, the liners 15 are returned to their advanced position in overlying engagement with the internal annular shoulder 18. This of course greatly reduces the internal diameter of the body 5 at the mouth of the same, so that the box 7 is securely and positively trapped. The tool may now be withdrawn, and will of course bring the sucker rod with it.

The clips 15 of which there may be two, are provided with disk shaped heads 20 having central openings for slidably receiving a bolt 22, and as illustrated in Figure 2, a suitable stout coil spring 24 is confined between the disk shaped members 20 and the head 10, and urges the slips to their advanced position in overlying engagement with the internal shoulder 18.

In operation, the tool is lowered into the well and the box 17 is guided into the socket of the body by the beveled forward end 6. When the box is engaged with the forward ends of the spring arms 17, the liners are moved rearwardly so as to allow the box to pass the internal shoulder 18. However, when the box 7 is past the shoulder 18, the spring 24 returns the spaced spring arms 17 to overlapping engagement with the shoulder 18, and the inside diameter of the body at its mouth is reduced, so that the sucker rod can be quickly drawn to the surface without the possibility of again being lost.

In summarizing, it will be seen that the liners effectively trap the box without the aid of teeth, and by reason of the spring employed, the disconnection of the box from the tool upon reaching the surface is rendered very easy.

Attention is also directed to the fact that the tool is especially adapted for working in close places and in case the box is not exactly upright in the well, it will be straightened by the lower end of the body 5.

It is to be understood that the form of the invention herewith shown and described is to be taken as a preferred embodiment of the same, and that such minor changes in arrangement and construction of parts may be made as will remain within the spirit of the invention and the scope of what is claimed.

Having thus described my invenion, what is claimed is:

1. A fishing tool comprising an elongated body having a socket opening out through the forward end thereof, the forward portion of the body being provided with an internal shoulder reducing the internal diameter of the socket at the forward end of the same transversely curved, liners slidable in the socket and having a plurality of spaced incision defining spring arms normally overlying said internal annular shoulder, said liners being provided with heads, a spring confined between the rear end of said body and said heads and urging the liners to their advanced position with the arms thereof in overlying engagement with the shoulder, and an attaching bolt extended through said heads and slidably connecting the heads of the body.

2. A fishing tool comprising an elongated body having a socket opening out through the forward end thereof, the forward portion of the body being provided with an internal shoulder reducing the internal diameter of the socket at the forward end of the same, liners slidable in the socket and having a plurality of spaced spring arms normally overlying said internal annular shoulder, said liners being provided with heads, a spring confined between the rear end of said body and said heads and urging the liners to their advanced position with the arms thereof in overlying engagement with the shoulder, and an attaching bolt extended through said heads and slidably connecting the heads of the body, said liners being approximately semi-circular in cross section and being arranged opposite each other.

BERT WOODS.